(12) United States Patent
Xi

(10) Patent No.: US 8,255,718 B2
(45) Date of Patent: Aug. 28, 2012

(54) POWER SAVING SYSTEM AND METHOD EMPLOYED IN COMPUTER

(75) Inventor: Chun-Fang Xi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 270 days.

(21) Appl. No.: 12/770,782

(22) Filed: Apr. 30, 2010

(65) Prior Publication Data
US 2011/0197084 A1 Aug. 11, 2011

(30) Foreign Application Priority Data
Feb. 9, 2010 (CN) .......................... 2010 1 0301415

(51) Int. Cl.
*G06F 1/32* (2006.01)

(52) U.S. Cl. ........................... 713/320; 455/573; 710/16

(58) Field of Classification Search .................. 713/320; 455/573; 710/16
See application file for complete search history.

(56) References Cited

U.S. PATENT DOCUMENTS

| | | | |
|---|---|---|---|
| 7,877,618 B2* | 1/2011 | Lewis et al. .................. | 713/310 |
| 2010/0219790 A1* | 9/2010 | Chadbourne et al. ......... | 320/107 |

* cited by examiner

*Primary Examiner* — Albert Wang
(74) *Attorney, Agent, or Firm* — Altis Law Group, Inc.

(57) ABSTRACT

A power saving system for a computer incorporating a standby power source includes a setting module, a detecting module and a controlling module. The setting module communicates with the BIOS of the computer and is configured for setting power saving modes on an interface provided by the BIOS for at least one function circuit, during the time the computer powered on. The detecting module is configured for detecting "enable" and/or "disable" signals output from the BIOS. The controlling module includes at least one switching circuit configured for correspondingly interrupting the power supply from the standby power source to one or more of the at least one function circuit after the computer is shut down and the detecting module receives "enable" signals.

17 Claims, 5 Drawing Sheets

200
POWER SAVING SYSTEM AND METHOD EMPLOYED IN COMPUTER

BACKGROUND

1. Technical Field

The disclosure relates to computers, and particularly, to a power saving system and a method employed in a computer.

2. Description of Related Art

A general condition often or even always occurs, for example, a number of function circuits of the computer, such as the USB circuit or the network circuit, still consume power after the computer has been shut down, which results in a power waste.

Therefore, it is desirable to provide a power saving system and a method employed in a computer, which can overcome the problems described above.

DETAILED DESCRIPTION

Figure 1:
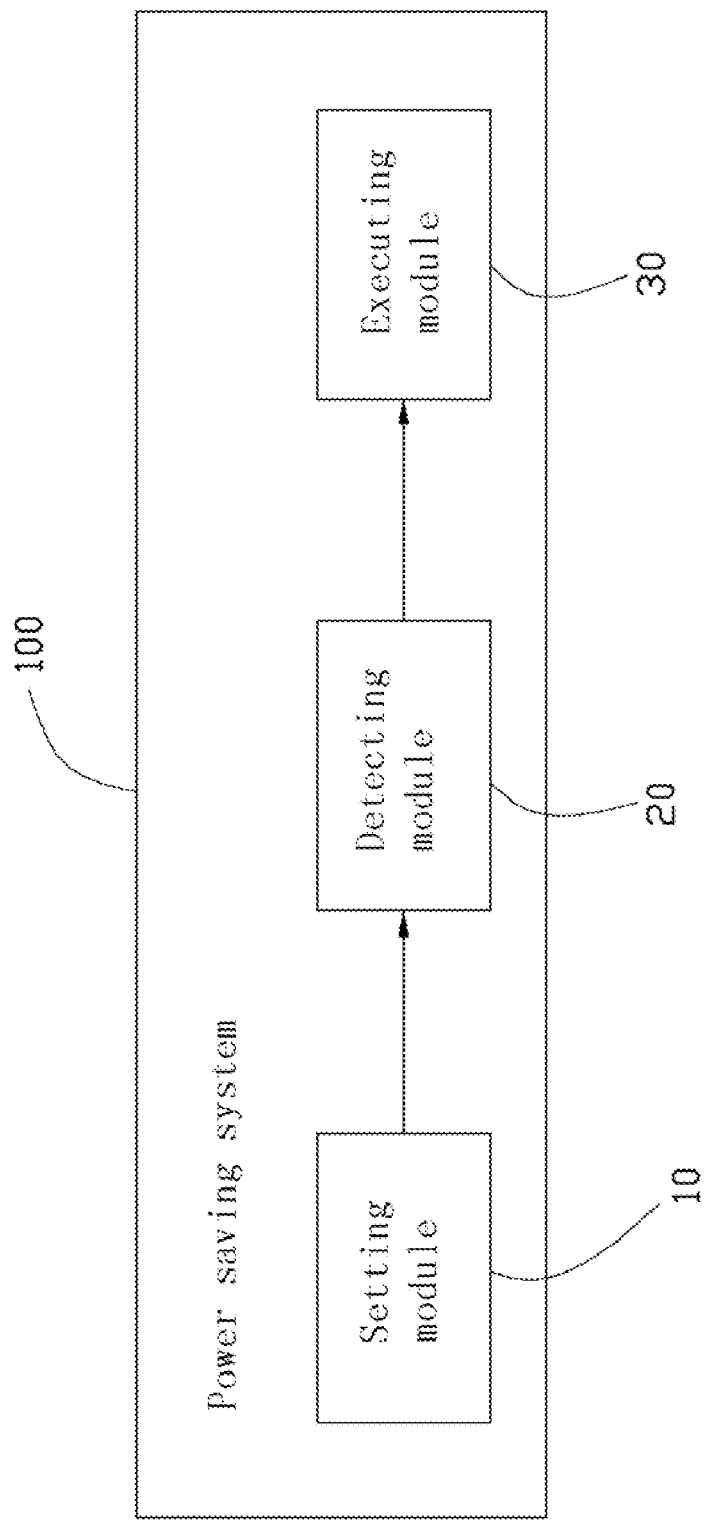
FIG. 1 is a functional block diagram of a power saving system employed in a computer, according to an exemplary embodiment.

Referring to FIG. 1, a power saving system 100 employed in a computer, according to an exemplary embodiment, includes a setting module 10, a detecting module 20 and a controlling module 30.

The computer has a standby power source 102 (shown in FIG. 2) configured to supply power to some standby components when the computer is shut down. In the present disclosure, the standby power source 102 provides an output voltage of 5V.

The setting module 10 communicates with the Basic Input Output System (BIOS) of the computer and is configured for setting power saving modes for at least one function circuit of the computer during the time the computer is powered on. In the present embodiment, the BIOS provides an interface presenting "enable" and "disable" options for users to choose enabling or disabling the power saving mode. The at least one function circuit includes but is not limited to a USB circuit 40, a network circuit 50, and a clock circuit 60 connected in parallel to the standby power source 102, and each corresponds to a pair of the options including an "enable" option and a "disable" option presented on the interface of the BIOS.

Figure 2:
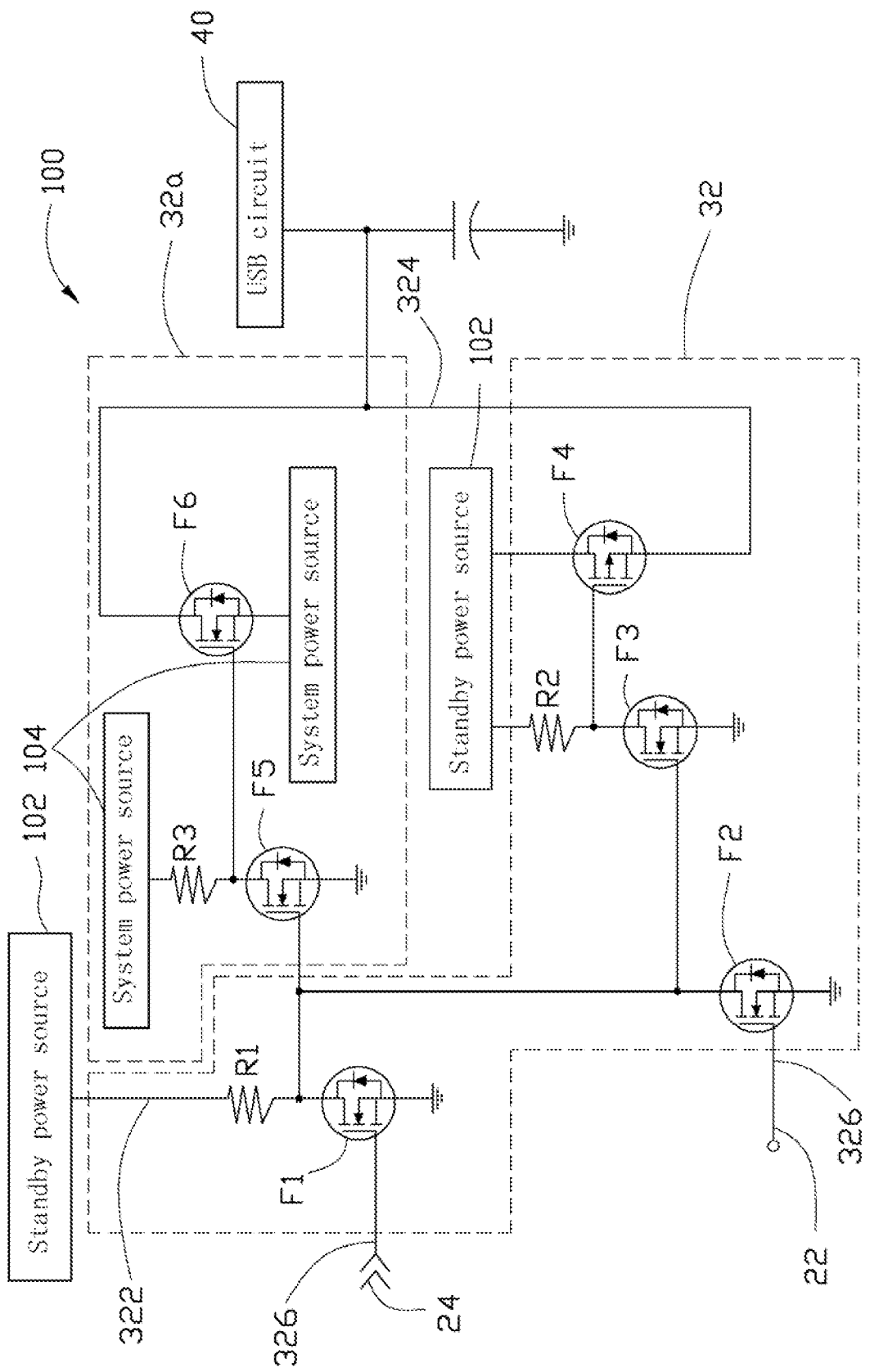
FIG. 2 is a circuit diagram of the power saving system of FIG. 1 controlling a USB circuit.

Referring to FIG. 2, the detecting module 20 is configured for detecting "enable" or "disable" signals from the BIOS. In detail, the detecting module 20 is connected to the CPU (not shown) of the computer for obtaining the outputs signals from the BIOS. The detecting module 20 includes a first detecting terminal 22 and a second detecting terminal 24. The first detecting terminal 22 can output the "enable" or "disable" signals from the BIOS through the CPU. The second detecting terminal 24 can output shut down signals from the CPU.

The controlling module 30 is configured for disabling the standby power source 102 to supply power to the function circuits, when the computer is shut down and the detecting module 20 receives "enable" signals. Furthermore, the controlling module 30 is also configured for enabling the standby power source 102 to supply power to the function circuits when the computer is shut down and the detecting module 20 detects "disable" signals.

In detail, the controlling module 30 includes three switching circuits 32 corresponding to the function circuits. Each switching circuit 32 includes an input terminal 322, an output terminal 324, and two control terminals 326. The input terminal 322 is connected to the standby power source 102. The output terminal 324 is connected to all of the corresponding function circuits, here the USB circuit 40, the network circuit 50 and the clock circuit 60 are used as example. The two control terminals 326 are respectively connected to the first detecting terminal 22, and the second detecting terminal 24 of the detecting module 20, and are configured for controlling the switching circuit 32 to switch on or off. In the present embodiment, each of the switching circuits 32 includes at least three field effect transistors (FETs).

For more detail, the switching circuit 32 corresponding to the USB circuit 40 includes a first FET F1, a second FET F2, a third FET F3, and a fourth FET F4. In the present embodiment, the first, second and third FETs F1, F2 and F3 are N-channel Metal Oxide Semiconductor (NMOS), while the fourth FET F4 is a P-channel Metal Oxide Semiconductor (PMOS). The gate of the first FET F1 is connected to the second detecting terminal 24. The source of the first FET F1 is grounded. The drain of the first FET F1 is connected to the standby power source 102 via a first resistor R1. The gate of the second FET F2 is connected to the first detecting terminal 22. The source of the second FET F2 is grounded. The drain of the second FET F2 is connected between the drain of the first FET F1 and the first resistor R1. The gate of the third FET F3 is connected to the drain of the second FET F2. The source of the third FET F3 is grounded. The drain of the third FET F3 is connected to the standby power source 102 via a second resistor R2. The gate of the fourth FET F4 is connected between the drain of the third FET F3 and the second resistor R2. The source of the fourth FET F4 is connected to the USB circuit 40. The drain of the fourth FET F4 is connected to the standby power source 102 directly.

When the computer is shut down and the power saving mode of the USB circuit 40 is set to "enable", the second detecting terminal 24 outputs a low level signal and the first detecting terminal 22 outputs a high level signal. As such, the second FET F2 is turned on while all of the first, third and fourth FETs F1, F3 and F4 are turned off. Therefore, the power supplied to the USB circuit 40 from the standby power source 102 is interrupted and power is saved. When the computer is shut down and the power saving mode of the USB circuit 40 is changed to "disable", the first detecting terminal 22 and the second detecting terminal 24 each output a low level signal. As such, the second FET F2 is changed to be turned off, while the third and fourth FETs F3 and F4 are changed to be turned on, thus the standby power source 102 powers the USB circuit 40.

Furthermore, the switching circuit 32 includes a work sub-circuit 32a connected to the USB circuit 40 for switching on the USB circuit 40 when the computer is powered on. In the present embodiment, the computer is powered by a system power source 104 which can output various voltages such as 12V and 5V. The sub-circuit 32a includes a fifth FET F5 and a sixth FET F6. The gate of the fifth FET F5 is connected between the drain of the first FET F1 and the first resistor R1. The source of the fifth FET F5 is grounded. The drain of the fifth FET F5 is connected to the system power source 104 via a third resistor R3. The gate of the sixth FET F6 is connected between the drain of the fifth FET F5 and the third resistor R3. The source of the sixth FET F6 is connected to the system power source 104. The drain of the sixth FET F6 is connected to the USB circuit 40.

When the computer is powered on, the second detecting terminal 24 outputs a high level signal. Thereby, the first FET F1 is turned on, the fifth FET F5 is turned off as the power supplied from the standby power source 102 is grounded through the first FET F1, and the sixth FET F6 is turned on by a potential difference from the system power source 104 produced between the gate and the source thereof. Thus, the system power source 104 can supply power to the USB circuit 40 through the sixth FET F6. When the computer is shut down and the power saving mode of the USB circuit 40 is set to "enable", the system power source 104 is removed. As such, the fifth and sixth FETs F5 and F6 are out of action and the power supplied to the USB circuit 40 from the standby power source 102 is interrupted.

Figure 3:
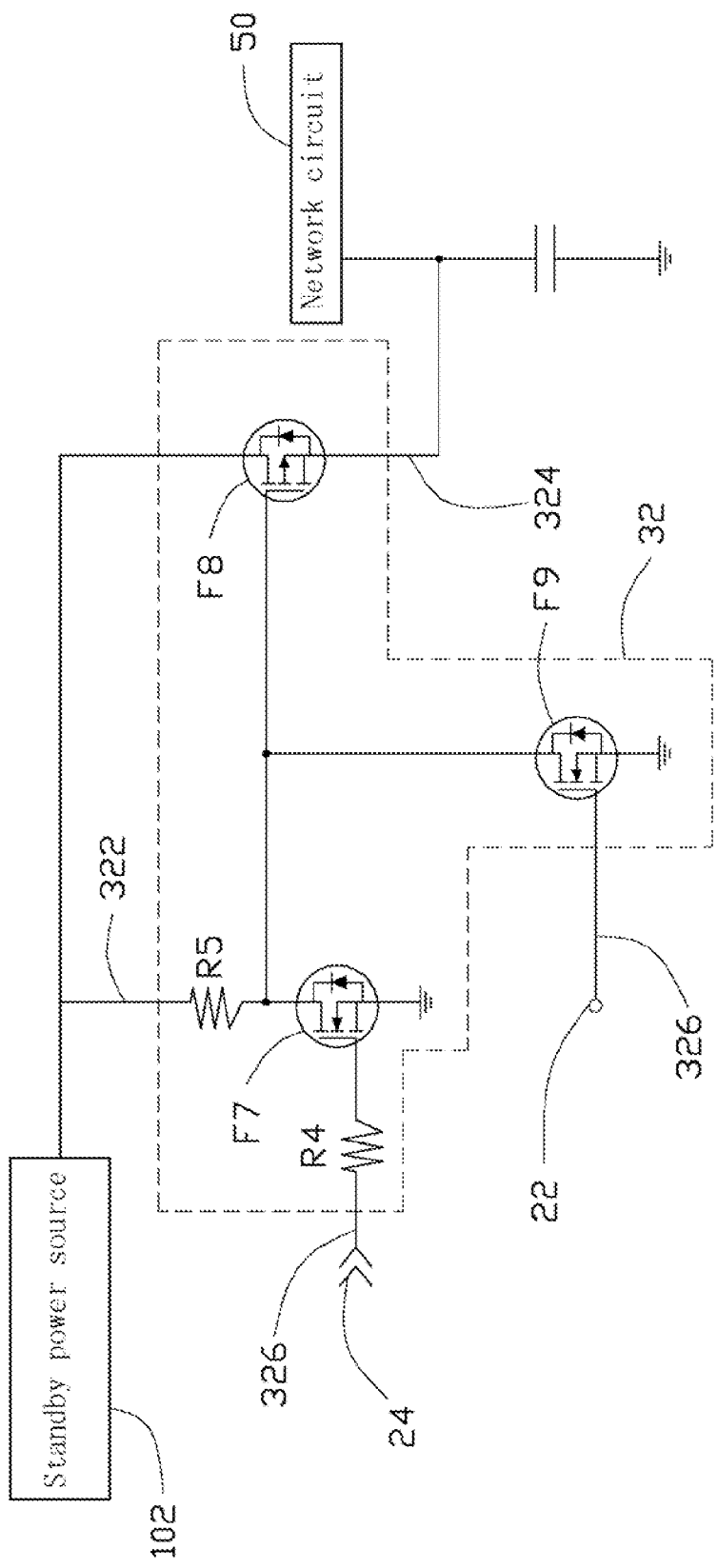
FIG. 3 is a circuit diagram of the power saving system of FIG. 1 controlling a network circuit.

Referring to FIG. 3, the switching circuit 32 corresponding to the network circuit 50 includes a seventh FET F7, an eighth FET F8, and a ninth FET F9. The gate of the seventh FET F7 is connected to the second detecting terminal 24 of the computer via a fourth resistor R4. The source of the seventh FET F7 is grounded. The drain of the seventh FET F7 is connected to the standby power source 102 via a fifth resistor R5. The gate of the eighth FET F8 is connected between the drain of the seventh FET F7 and the fourth resistor R4. The source of the eighth FET F8 is connected to the standby power source 102. The drain of the eighth FET F8 is connected to the network circuit 50. The gate of the ninth FET F9 is connected to the first detecting terminal 22. The source of the ninth FET F9 is grounded. The drain of the ninth FET F9 is connected between the drain of the seventh FET F7 and the gate of the eighth FET F8.

When the computer is shut down and the power saving mode of the network circuit 50 is set to "enable", the second detecting terminal 24 and the first detecting terminal 22 each output a low level signal, then all the seventh, eighth and ninth FETs F7, F8 and F9 are turned off. Therefore, the power supplied to the network circuit 50 from the standby power source 102 is interrupted and power is saved. When the power saving mode of the network circuit 50 is set to "disable", the first detecting terminal 22 outputs a high level signal. Both the eighth and ninth FETs F8 and F9 are turned on while the seventh FET F7 is turned off, thus the standby power source 102 supplies power to the network circuit 50.

Figure 4:
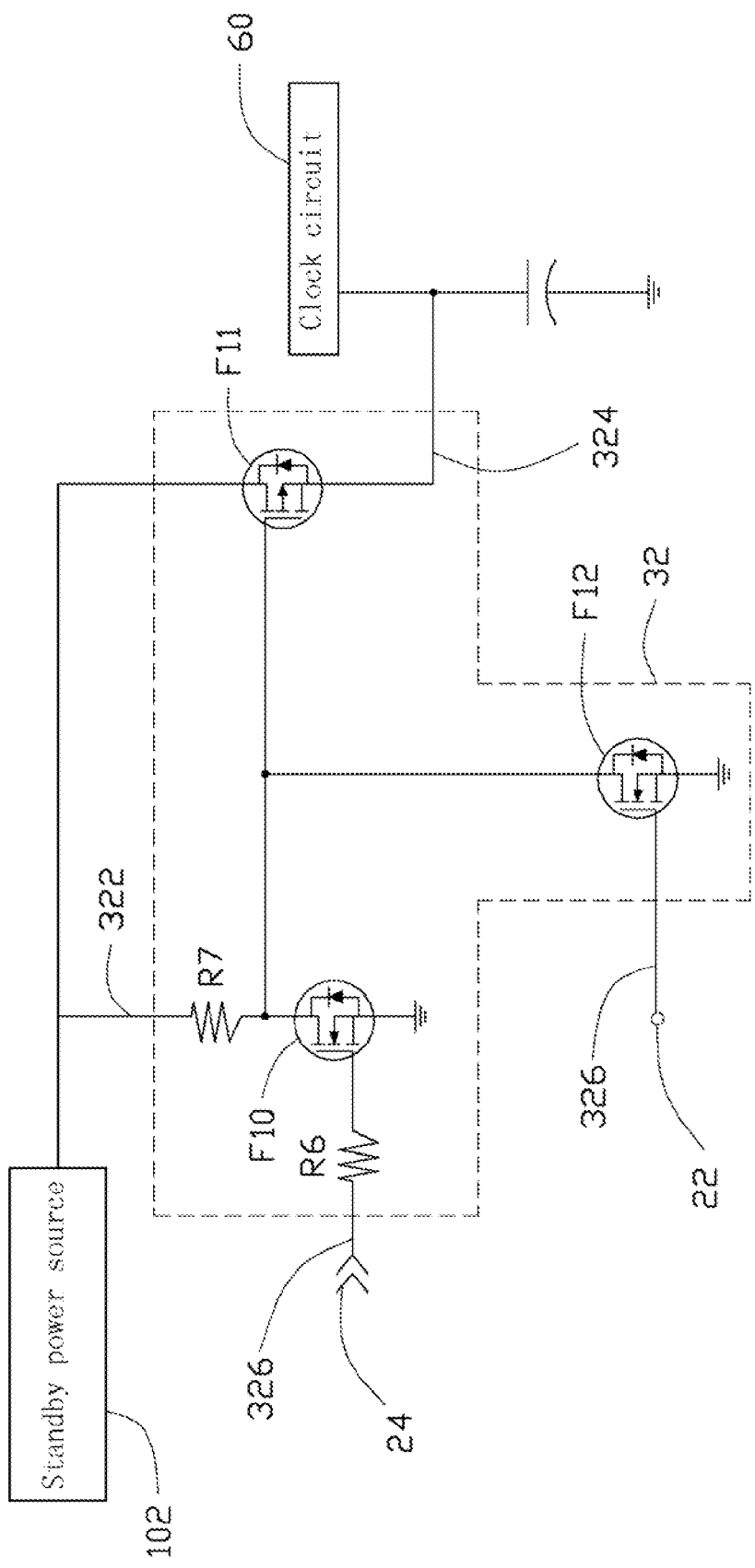
FIG. 4 is a circuit diagram of the power saving system of FIG. 1 controlling a clock circuit.

Referring to FIG. 4, the switching circuit 32 corresponding to the clock circuit 60 is similar to that of the network circuit 50. In detail, the switching circuit 32 corresponding to the clock circuit 60 includes a tenth FET F10, an eleventh EFT F11, and a twelfth FET F12. The gate of the tenth FET F10 is connected to the second detecting terminal 24 of the computer via a sixth resistor R6. The source of the tenth FET F10 is grounded. The drain of the tenth FET F10 is connected to the standby power source 102 via a seventh resistor R7. The gate of the eleventh EFT F11 is connected between the drain of the tenth FET F10 and the seventh resistor R7. The source of the eleventh EFT F11 is connected to the standby power source 102. The drain of the eleventh EFT F11 is connected to the clock circuit 60. The gate of the twelfth FET F12 is connected to the first detecting terminal 22 of the detecting module 20. The source of the twelfth FET F12 is grounded. The drain of the twelfth FET F12 is connected between the drain of the tenth FET F10 and the gate of the eleventh EFT F11.

When the computer is shut down and the power saving mode of the clock circuit 60 is set to "enable", the second detecting terminal 24 and the first detecting terminal 22 each output a low level signal, thus all the tenth, the eleventh and the twelfth FETs F10, F11 and F12 are turned off. Therefore, the power supplied to the clock circuit 60 from the standby power source 102 is interrupted and power is saved. When the power saving mode of the clock circuit 60 is set to "disable", the first detecting terminal 22 outputs a high level signal. Both the eleventh and twelfth FETs F11 and F12 are turned on while the tenth FET F10 is turned off, thus the standby power source 102 supplies power to the clock circuit 60.

Figure 5:
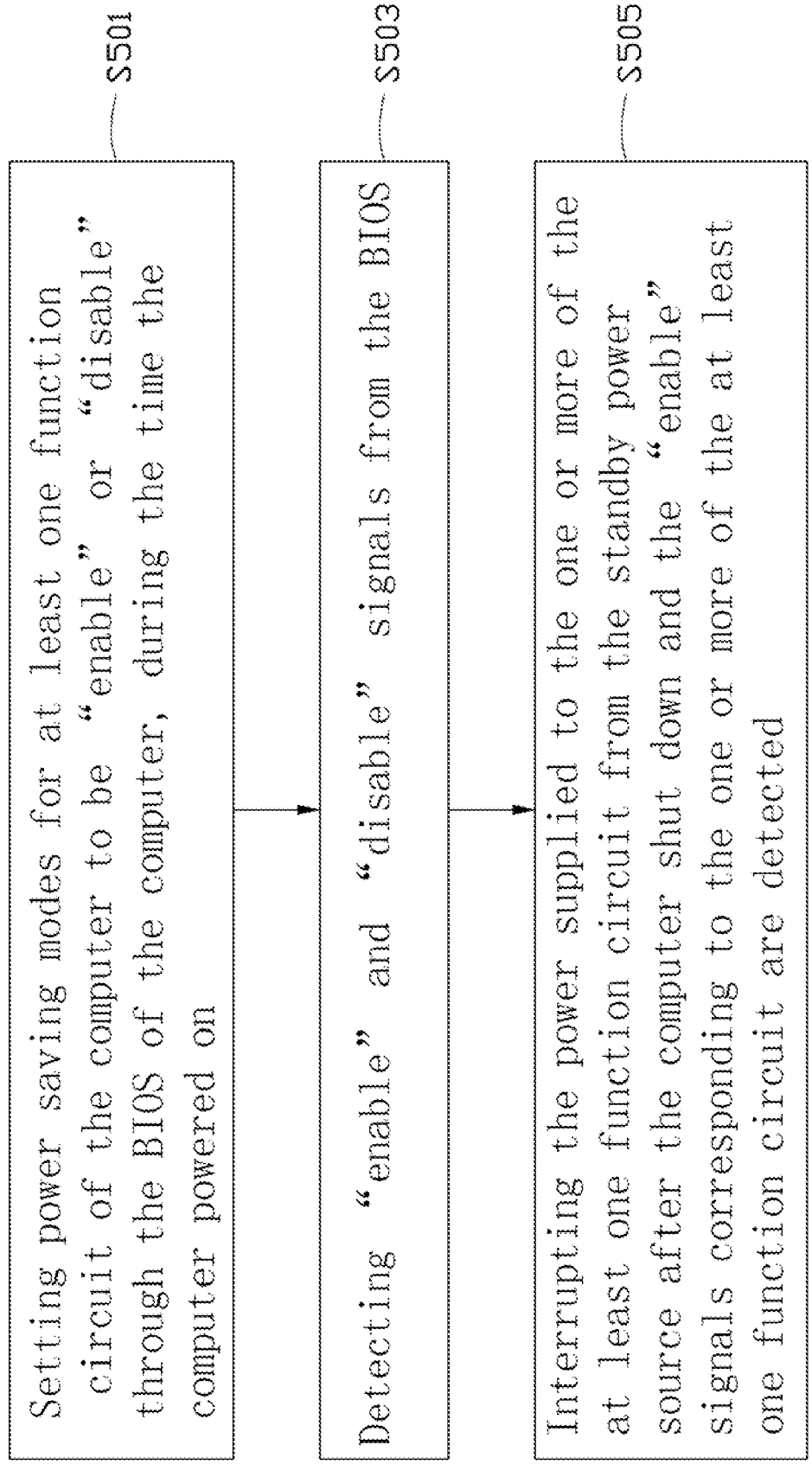
FIG. 5 is a flow chart of a power saving method, according to an embodiment.

Referring to FIG. 5, a power saving method used in the computer which includes the standby power source 102, includes the following steps S501~S503.

In step S501, power saving modes for at least one function circuit each is set to "enable" or "disable" through the BIOS of the computer, during the time the computer is powered on.

In step S503, "enable" signals or "disable" signals or both output from the BIOS are detected, each "enable" signal corresponds to the "enable" of power saving mode of one particular function circuit, and each "disable" signal corresponds to the "disable" of power saving mode of another particular function circuit.

In step S505, the power supplied to particular one of the function circuits from the standby power source 102 is interrupted after the computer is shut down and if the corresponding "enable" signals are detected. The power supplied to the particular one of the function circuits from the standby power source 102 is maintained after the computer is shut down and if the corresponding "disable" signals are detected.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A power saving system employed in a computer which comprises a standby power source, comprising:
    a setting module communicating with the BIOS of the computer and configured for setting power saving modes on an interface provided by the BIOS for at least one function circuit, during the time the computer powered on;
    a detecting module configured for detecting "enable" and/or "disable" signals output from the BIOS, each "enable" signal corresponding to the "enable" of power saving mode of one of the at least one function circuit and each "disable" signal corresponding to the "disable" of power saving mode of one of the at least one function circuit; and
    a controlling module comprising at least one switching circuit configured for correspondingly interrupting the power supplied from the standby power source to one or more of the at least one function circuit after the computer shut down and the detecting module receiving "enable" signals corresponding to the one or more of the at least one function circuit;
    wherein the at least one function circuit comprises a USB circuit, a network circuit, and a clock circuit all connected to the standby power source in parallel, through the corresponding switching circuits;
    wherein the detecting module comprises a first detecting terminal for outputting the "enable" or "disable" signals from the BIOS and a second detecting terminal for outputting shut down signals of the computer.

2. The power saving system of claim 1, wherein each of the at least one switching circuit comprises an input terminal, an output terminal, and two control terminals, wherein the input terminal is connected to the standby power source, the output terminal is connected to the corresponding function circuits, the two control terminals are respectively connected to the first detecting terminal and the second detecting terminal of the detecting module, and the two control terminals are configured for controlling the switching circuit to switch on or off.

3. The power saving system of claim 2, wherein each of the at least one switching circuit comprises at least three field effect transistors (FETs).

4. The power saving system of claim 3, wherein the switching circuit corresponding to the USB circuit comprises a first FET, a second FET, a third FET, and a fourth FET, the first, second and third FETs are N-channel Metal Oxide Semiconductor (NMOS) transistors, while the fourth FET is a P-channel Metal Oxide Semiconductor (PMOS) transistor, wherein the gate of the first FET is connected to the second detecting terminal, the source of the first FET is grounded, the drain of the first FET is connected to the standby power source, the gate of the second FET is connected to the first detecting terminal, the source of the second FET is grounded, the drain of the second FET is connected to the drain of the first FET, the gate of the third FET is connected to the drain of the second FET, the source of the third FET is grounded, the drain of the third FET is connected to the standby power source, the gate of the fourth FET is connected to the drain of the third FET, the source of the fourth FET is connected to the USB circuit, the drain of the fourth FET is connected to the standby power source.

5. The power saving system of claim 4, wherein the at least one switching circuit further comprises a work sub-circuit connected to the USB circuit for switching on the USB circuit when the computer is powered on.

6. The power saving system of claim 5, further comprising a system power source for supplying power to the computer, the sub-circuit comprises a fifth FET and a sixth FET, the fifth and sixth FETs are NMOS transistors, the gate of the fifth FET is connected to the drain of the first FET, the source of the fifth FET is grounded, the drain of the fifth FET is connected to the system power source, the gate of the sixth FET is connected to the drain of the fifth FET, the source of the sixth FET is connected to the system power source, the drain of the sixth FET is connected to the USB circuit.

7. The power saving system of claim 1, wherein the switching circuit corresponding to the network circuit or the clock circuit comprises a seventh FET, an eighth FET, and a ninth FET, the seventh and the ninth FETs are NMOS transistors, while the eighth FET is a PMOS transistor, wherein the gate of the seventh FET is connected to the second detecting terminal of the computer, the source of the seventh FET is grounded, the drain of the seventh FET is connected to the standby power source, the gate of the eighth FET is connected to the drain of the seventh FET, the source of the eighth FET is connected to the standby power source, the drain of the eighth FET is connected to the network circuit, the gate of the ninth FET is connected to the first detecting terminal of the detecting module, the source of the ninth FET is grounded, and the drain of the ninth FET is connected between the drain of the seventh FET and the gate of the eighth FET.

8. A power saving method for a computer incorporating a standby power source comprising the following steps:

setting power saving modes for at least one function circuit of the computer to be "enable" or "disable" through the BIOS of the computer, during the time the computer powered on;

detecting "enable" and "disable" signals from the BIOS, wherein each "enable" signal corresponding to the "enable" of power saving mode of one of the at least one function circuit and each "disable" signal corresponding to the "disable" of power saving mode of one of the at least one function circuit; and interrupting the power supplied to the one or more of the at least one function circuit from the standby power source after the computer shut down and the "enable" signals corresponding to the one or more of the at least one function circuit are detected;

wherein the "enable" and "disable" signals from the BIOS are detected by a detecting module, and the detecting module comprises a first detecting terminal for outputting the "enable" or "disable" signals from the BIOS and a second detecting terminal for outputting shut down signals of the computer.

9. The power saving method of claim 8, further comprising a step of:

supplying power from the standby power source to one or more of the at least one function circuit after the computer is shut down and the "disable" signals corresponding to one or more of the at least one function circuit are detected.

10. An apparatus, comprising:
a standby power source;
a function circuit;
a basis input output system (BIOS) for enabling or disabling a power saving mode for the function circuit; and
a power saving system connected between the standby power source and the function circuit, the power saving system comprising:
a detecting module configured for detecting an "enable" signal or a "disable" signal from the BIOS, the "enable" signal representing enablement of the power saving mode of the function circuit, and the "disable" signal representing disablement of the power saving mode of the function circuit;
a controlling module comprising a switching circuit configured for preventing the standby power source from providing power to the function circuit when the detecting module receiving the "enable" signal representing the enablement of the power saving mode of the function circuit;
wherein the detecting module comprises a first detecting terminal for outputting the "enable" signal or the "disable" signal from the BIOS and a second detecting terminal for outputting shut down signals of the computer.

11. The apparatus of claim 10, wherein the function circuit comprises at least one of a USB circuit, a network circuit, and a clock circuit connected to the standby power source through the switching circuit.

12. The apparatus of claim 11, wherein the power saving system further comprises: a setting module communicating with the BIOS, the setting module configured for setting the enablement or disablement of the power saving mode for the function circuit on an interface provided by the BIOS.

13. The apparatus of claim 12, wherein each of the at least one switching circuit comprises an input terminal, an output terminal, and two control terminals, wherein the input terminal is connected to the standby power source, the output terminal is connected to the function circuit, the two control terminals are respectively connected to the first detecting terminal and the second detecting terminal of the detecting module, and the two control terminals are configured for controlling the switching circuit to switch on or off.

14. The apparatus of claim 13, wherein the switching circuit corresponding to the USB circuit comprises a first FET, a second FET, a third FET, and a fourth FET, the first, second and third FETs are N-channel Metal Oxide Semiconductor (NMOS) transistors, while the fourth FET is a P-channel Metal Oxide Semiconductor (PMOS) transistor, wherein the gate of the first FET is connected to the second detecting terminal, the source of the first FET is grounded, the drain of the first FET is connected to the standby power source, the gate of the second FET is connected to the first detecting terminal, the source of the second FET is grounded, the drain of the second FET is connected to the drain of the first FET, the gate of the third FET is connected to the drain of the second FET, the source of the third FET is grounded, the drain of the third FET is connected to the standby power source, the gate of the fourth FET is connected to the drain of the third FET, the source of the fourth FET is connected to the USB circuit, the drain of the fourth FET is connected to the standby power source.

15. The apparatus of claim 14, wherein the at least one switching circuit further comprises a work sub-circuit connected to the USB circuit for switching on the USB circuit when the computer is powered on.

16. The apparatus of claim 15, further comprising a system power source for supplying power to the computer, the sub-circuit comprises a fifth FET and a sixth FET, the fifth and sixth FETs are NMOS transistors, the gate of the fifth FET is connected to the drain of the first FET, the source of the fifth FET is grounded, the drain of the fifth FET is connected to the system power source, the gate of the sixth FET is connected to the drain of the fifth FET, the source of the sixth FET is connected to the system power source, the drain of the sixth FET is connected to the USB circuit.

17. The apparatus of claim 10, wherein the switching circuit corresponding to the network circuit or the clock circuit comprises a seventh FET, an eighth FET, and a ninth FET, the seventh and the ninth FETs are NMOS transistors, while the eighth FET is a PMOS transistor, wherein the gate of the seventh FET is connected to the second detecting terminal of the computer, the source of the seventh FET is grounded, the drain of the seventh FET is connected to the standby power source, the gate of the eighth FET is connected to the drain of the seventh FET, the source of the eighth FET is connected to the standby power source, the drain of the eighth FET is connected to the network circuit, the gate of the ninth FET is connected to the first detecting terminal of the detecting module, the source of the ninth FET is grounded, and the drain of the ninth FET is connected between the drain of the seventh FET and the gate of the eighth FET.

* * * * *